US012785257B2

(12) United States Patent
Lin et al.

(10) Patent No.: US 12,785,257 B2
(45) Date of Patent: Nov. 3, 2026

(54) VIRTUAL REALITY DEVICE

(71) Applicant: HTC Corporation, Taoyuan City (TW)

(72) Inventors: Cheng-Hung Lin, Taoyuan City (TW); Chun-Chieh Wang, Taoyuan City (TW); Chun-Hsien Lee, Taoyuan City (TW); Yu-Chieh Chiu, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 430 days.

(21) Appl. No.: 18/179,396

(22) Filed: Mar. 7, 2023

(65) Prior Publication Data

US 2023/0402742 A1 Dec. 14, 2023

Related U.S. Application Data

(60) Provisional application No. 63/350,872, filed on Jun. 10, 2022.

(51) Int. Cl.

*H01Q 1/27* (2006.01)
*G06F 1/16* (2006.01)
*H01Q 1/02* (2006.01)
*H01Q 1/52* (2006.01)
(Continued)

(52) U.S. Cl.

CPC ............ *H01Q 1/273* (2013.01); *G06F 1/163* (2013.01); *H01Q 1/02* (2013.01); *H01Q 1/521* (2013.01); *H01Q 5/40* (2015.01); *H01Q 21/30* (2013.01)

(58) Field of Classification Search

CPC .......... H01Q 1/02; H01Q 1/273; H01Q 1/521; H01Q 5/40; H01Q 21/28; H01Q 21/30; G06F 1/163; G06F 1/1698; G06F 1/203

See application file for complete search history.

(56) References Cited

U.S. PATENT DOCUMENTS

| | | | | |
|---|---|---|---|---|
| 9,092,898 | B1 * | 7/2015 | Fraccaroli ............ | G02B 27/017 |
| 11,073,903 | B1 | 7/2021 | Ouderkirk et al. | |
| 11,342,671 | B2 * | 5/2022 | Téllez .................. | H01Q 13/103 |

(Continued)

FOREIGN PATENT DOCUMENTS

| | | |
|---|---|---|
| CN | 107636897 | 1/2018 |
| CN | 209860146 | 12/2019 |

(Continued)

OTHER PUBLICATIONS

"Office Action of Taiwan Counterpart Application", issued on Dec 18, 2023, p. 1-p. 7.

(Continued)

*Primary Examiner* — Alexander H Taningco
(74) *Attorney, Agent, or Firm* — JCIPRNET

(57) ABSTRACT

A virtual reality device is provided. The virtual reality device includes a main body portion, a plurality of first-type antennas, and a plurality of second-type antennas. The main body portion has a first side eyeglass frame, a second side eyeglass frame, and a connection part. The connection part is connected to the first side eyeglass frame and the second side eyeglass frame. The second-type antennas and the corresponding first-type antennas are respectively disposed on a first side of the first side eyeglass frame, on a second side of the second side eyeglass frame, and on the connection part. The first side of the first side eyeglass frame is opposite to the second side of the second side eyeglass frame.

10 Claims, 5 Drawing Sheets

(51) Int. Cl.
*H01Q 5/40* (2015.01)
*H01Q 21/30* (2006.01)

(56) References Cited

U.S. PATENT DOCUMENTS

| | | | | |
|---|---|---|---|---|
| 12,007,810 | B2 * | 6/2024 | Maric | H01Q 1/38 |
| 2008/0055537 | A1 * | 3/2008 | Asrani | H01Q 25/00 351/41 |
| 2016/0204839 | A1 * | 7/2016 | Liu | H04B 1/385 345/8 |
| 2018/0062248 | A1 * | 3/2018 | Psychoudakis | H04B 1/385 |
| 2020/0241611 | A1 * | 7/2020 | Allin | G06F 1/206 |
| 2020/0313299 | A1 * | 10/2020 | Jia | H01Q 5/378 |
| 2020/0335869 | A1 * | 10/2020 | Jia | H01Q 9/0457 |
| 2020/0388922 | A1 | 12/2020 | Téllez | |
| 2021/0313703 | A1 * | 10/2021 | Stanley | H01Q 21/0006 |
| 2021/0408687 | A1 * | 12/2021 | Lee | H01Q 1/526 |
| 2022/0013911 | A1 * | 1/2022 | Lee | H01Q 9/0414 |
| 2022/0123479 | A1 * | 4/2022 | So | H01Q 21/28 |
| 2022/0155604 | A1 * | 5/2022 | Woods, Jr. | G06F 3/011 |
| 2022/0285828 | A1 * | 9/2022 | Yun | G04G 21/04 |
| 2023/0096634 | A1 * | 3/2023 | Shih | H01Q 1/42 343/700 R |
| 2023/0238688 | A1 * | 7/2023 | Moussakhani | H01Q 1/273 343/702 |
| 2023/0333376 | A1 * | 10/2023 | Zhang | H01Q 5/40 |
| 2024/0097311 | A1 * | 3/2024 | De Luis | H01Q 21/28 |
| 2024/0356203 | A1 * | 10/2024 | Apaydin | H01Q 1/273 |

FOREIGN PATENT DOCUMENTS

| | | | | |
|---|---|---|---|---|
| CN | 112310641 | | 2/2021 | |
| CN | 112445000 A | * | 3/2021 | H01Q 21/00 |
| CN | 113745832 | | 12/2021 | |
| CN | 114079138 B | * | 4/2025 | G02C 11/10 |
| EP | 3392690 | | 10/2018 | |

OTHER PUBLICATIONS

"Office Action of China Counterpart Application", issued on Apr. 16, 2026, p. 1-p. 9.

* cited by examiner

VIRTUAL REALITY DEVICE

CROSS-REFERENCE TO RELATED APPLICATION

This application claims the priority benefit of U.S. provisional application Ser. No. 63/350,872, filed on Jun. 10, 2022. The entirety of the above-mentioned patent application is hereby incorporated by reference herein and made a part of this specification.

TECHNICAL FIELD

The disclosure relates to a virtual reality technology; more particularly, the disclosure relates to a virtual reality device with a relatively wide antenna transmission range.

DESCRIPTION OF RELATED ART

People skilled in the virtual reality field are able to apply a wireless communication technology to replace physical transmission lines, so as to improve the convenience and flexibility of using virtual reality devices (for instance, communication glasses). In response to requirements for user convenience, a general virtual reality device may be equipped with a Sub-6G antenna and an mmWave antenna, so as to provide a variety of frequency bands. Specifically, the frequency band of the Sub-6G antenna is approximately within a range from 4501 Hz to 6 GHz (including 4G, Wi-Fi, Bluetooth, and so on), and the Sub-6G antenna requires a relatively large accommodation space; the frequency band of the mmWave antenna is approximately within a range from 24 GHz to 52 GHz, and the mmWave antenna is a beamforming antenna having directionality. However, the way to arrange a plurality of the antennas in the virtual reality device is subject to mutual crosstalk between the antennas, whereby the transmission range and radiation characteristics of the antennas may be affected.

SUMMARY

In view of the above, a virtual reality device is provided in the disclosure, where a plurality of antennas are combined to improve a transmission range and radiation characteristics of the antennas.

A virtual reality device provided herein includes a main body portion, a plurality of first-type antennas, and a plurality of second-type antennas. The main body portion has a first side eyeglass frame, a second side eyeglass frame, and a connection part. The connection part is connected to the first side eyeglass frame and the second side eyeglass frame. The second-type antennas and the corresponding first-type antennas are respectively disposed on a first side of the first side eyeglass frame, on a second side of the second side eyeglass frame, and on the connection part. The first side of the first side eyeglass frame is opposite to the second side of the second side eyeglass frame.

In light of the foregoing, the second-type antennas and the corresponding first-type antennas of the virtual reality device provided herein may be combined and disposed on the main body portion, so as to maintain the characteristics of the first-type antennas and the second-type antennas and further improve a transmission coverage and radiation intensity.

DESCRIPTION OF THE EMBODIMENTS

Some embodiments provided in the disclosure are described in detail below with reference to the accompanying drawings, and the same components in the following description and in different drawings will be denoted by the same reference numbers and signs. These embodiments are a part of the invention and do not disclose all implementation manner of the invention. More particularly, these embodiments serve to exemplify what is claimed in the disclosure.

Figure 1:
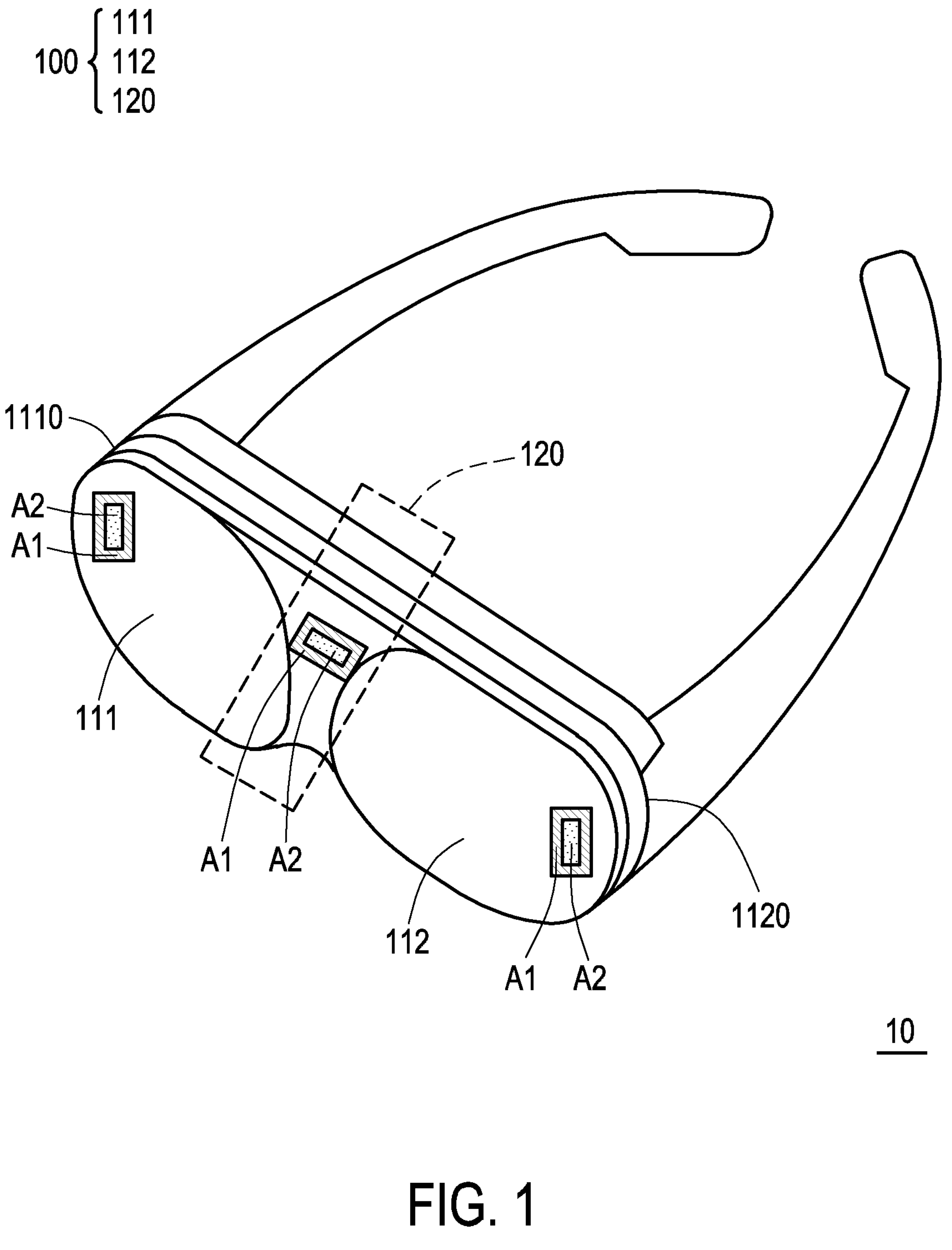
FIG. 1 is a schematic view illustrating a virtual reality device according to a first embodiment of the disclosure.

FIG. 1 is a schematic view illustrating a virtual reality device according to a first embodiment of the disclosure. With reference to FIG. 1, a virtual reality device 10 includes a main body portion 100, a plurality of first-type antennas A1, and a plurality of second-type antennas A2. The main body portion 100 has a first side eyeglass frame 111, a second side eyeglass frame 112, and a connection part 120. The connection part 120 may connect the first side eyeglass frame 111 and the second side eyeglass frame 112. The second-type antennas A2 and the corresponding first-type antennas A1 may be disposed on a first side 1110 of the first side eyeglass frame 111, respectively. Similarly, the second-type antennas A2 and the corresponding first-type antennas A1 are disposed on a second side 1120 of the second side eyeglass frame 112, respectively. The first side 1110 of the first side eyeglass frame 111 is opposite to the second side 1120 of the second side eyeglass frame 112. In addition, the second-type antennas A2 and the corresponding first-type antennas A1 are disposed on the connection part 120, respectively.

Specifically, the first-type antennas A1 may be the Sub-6G antennas, and the second-type antennas A2 may be the mmWave antennas. In the present embodiment, the first-type antennas A1 (i.e., the Sub-6G antennas) require a relatively large accommodation space due to the resonance frequencies of the first-type antennas A1. In addition, the second-type antennas A2 (i.e., the mmWave antennas) are the beamforming antennas having directionality. Therefore, the second-type antennas A2 are required to be disposed at a suitable location to provide a relatively wide transmission range.

To be specific, if a user arranges the first-type antennas A1 and the second-type antennas A2 on the main body portion 100 based on the characteristics of the first-type antennas A1 (that i.e., limiting the arrangement of the second-type antennas A2), the transmission range of the second-type antennas A2 is reduced, thereby generating a blind spot of the second-type antennas A2 in terms of transmission. In another aspect, if the user arranges the first-type antennas A1 and the second-type antennas A2 on the main body portion 100 based on the characteristics of the second-type antennas A2 (i.e., limiting the arrangement of the first-type antennas A1), the radiation characteristics of the first-type antennas A1 may be decreased.

Accordingly, if the second-type antennas A2 and the corresponding first-type antennas A1 are combined and disposed at the main body portion 100, the characteristics of 1, a the first-type antennas A1 and the second-type antennas A2 in the virtual reality device 10 may be maintained at the same time. Particularly, as shown in FIG. 1, the virtual reality device 10 may complement the coverage range of the mmWave signal having directionality by collectively arrange the second-type antennas A2 and the first-type antennas A1 on the first side 1110 and the second side 1120 and maintain the transmission intensity of the Sub-6G signals, so as to expand the transmission range and the radiation characteristics of the virtual reality device 10.

In an embodiment, the first-type antennas A1 and the second-type antennas A2 may be disposed on the main body portion 100, respectively. For instance, the second-type antennas A2 may be disposed on the connection part 120 alone. The manner of arranging the first-type antennas A1 and the second-type antennas A2 may be determined by the user and is not subject to certain restrictions.

Figure 2A:
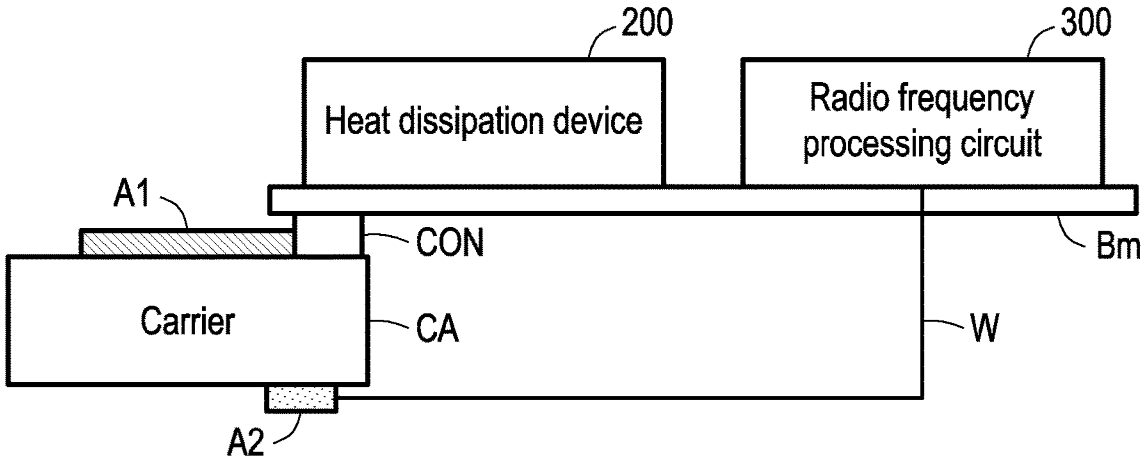
FIG. 2A is a schematic view illustrating a portion of a virtual reality device according to a second embodiment of the disclosure.
Figure 2B:
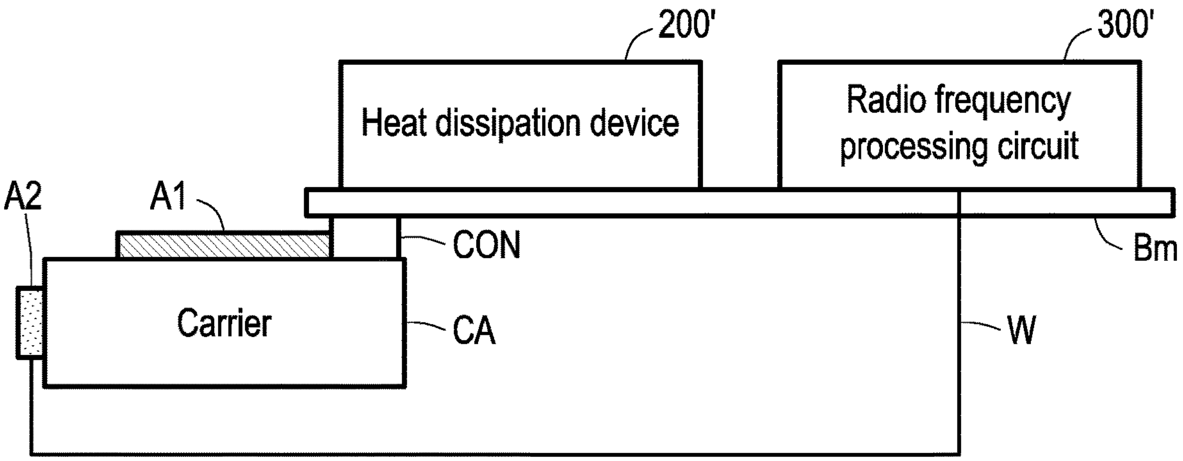
FIG. 2B is a schematic view illustrating a portion of a virtual reality device according to a third embodiment of the disclosure.

FIG. 2A and FIG. 2B are schematic views illustrating a portion of a virtual reality device according to a second embodiment and a third embodiment of the disclosure, respectively. With reference to FIG. 1, FIG. 2A, and FIG. 2B, the virtual reality device 10 further includes heat dissipation devices 200 and 200' and radio frequency signal processing circuits 300 and 300'. The heat dissipation devices 200 and 200' and the radio frequency signal processing circuits 300 and 300' are disposed on a mainboard Bm. The first-type antennas A1 may be disposed on a first surface of a carrier CA, and the second-type antennas A2 may be disposed on a second surface of the carrier CA. Accordingly, the first-type antennas A1 and the second-type antennas A2 are co-constructed on the same carrier CA. The first-type antennas A1 and the second-type antennas A2 may transfer heat energy generated by themselves to the heat dissipation devices 200 and 200' on the mainboard Bm through a connector CON and the carrier CA for heat dissipation.

The first-type antennas A1 may be coupled to the mainboard Bm through the connector CON. To be specific, the first-type antennas A1 may transmit or receive a first-type radio frequency signal via the connector CON. Specifically, the first-type radio frequency signal may be fed into the first-type antennas A1 (e.g., the Sub-6G antennas) through the connector (e.g., a shrapnel, a screw lock, or a coaxial cable), so as to excite the first-type antennas A1 directly or in a coupling manner to reach a working frequency band of the first-type radio frequency signal (Sub-6G).

In another aspect, the radio frequency signal processing circuits 300 and 300' may be electrically coupled to the second-type antennas A2 through a conductive wire W. Accordingly, the second-type antennas A2 may transmit or receive a second-type radio frequency signal through the conductive wire W and the radio frequency signal processing circuits 300 and 300'. Specifically, the second-type radio frequency signal may be fed into the second-type antennas A2 (e.g., the mmWave antennas) through the radio frequency signal processing circuits 300 and 300' and the conductive wire W, such as a coaxial cable or a low-loss transmission line made of liquid crystal polymer (LCP), modified polyimide, or modified polyimide resin (MPI), so as to excite the second-type antennas A2 directly or in a coupling manner to reach a working frequency band of the second-type radio frequency signal (mmWave).

It is worth mentioning that the working frequency band of the first-type radio frequency signal is different from that of the second-type radio frequency signal. For instance, the transmission frequency band of the first-type antennas A1 (e.g., the Sub-6G antennas) is approximately within a range from 450 MHz to 6 GHz; the transmission frequency band of the second-type antennas A2 (e.g., the mmWave antennas) is approximately within a range from 24 GHz to 52 GHz. It may thus be learned that the first-type antennas A1 and the second-type antennas are respectively coupled to two independent signal sources. Accordingly, the two signal sources may respectively provide the first-type radio frequency signal and the second-type radio frequency signal with different working frequency bands to the first-type antennas A1 and the second-type antennas A2.

Thereby, the virtual reality device 10 may apply the first-type antennas A1 and the second-type antennas A2 with different working frequency bands to meet the increasing communication demands, and through the combination of the two types of antennas, the characteristics of the two types of antennas may be maintained, and the transmission coverage and the radiation intensity of the virtual reality device 10 may be improved.

With reference to FIG. 2A, in the second embodiment, the first-type antennas A1 may be disposed on the first surface of the carrier CA (e.g., the upper surface), and the second-type antennas A2 may be disposed on the second surface of the carrier CA (e.g., the lower surface). The first surface is opposite to the second surface.

In addition, with reference to FIG. 2B, in the third embodiment, the first-type antennas A1 may be disposed on the first surface of the carrier CA (e.g., the upper surface), and the second-type antennas A2 may be disposed on the second surface of the carrier CA (e.g., the side surface). The first surface and the second surface are adjacent to each other. The arrangement relationship between the first-type antennas A1 and the second-type antennas A2 may be determined by the user according to actual needs and should not be construed as a limitation in the disclosure.

Figure 3A:
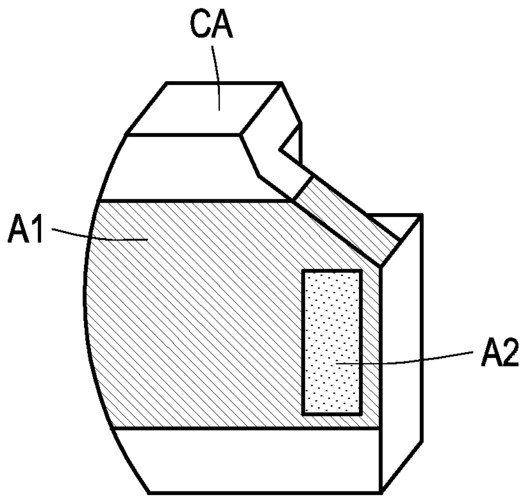
FIG. 3A illustrates an antenna configuration on a carrier according to a fourth embodiment of the disclosure.
Figure 3B:
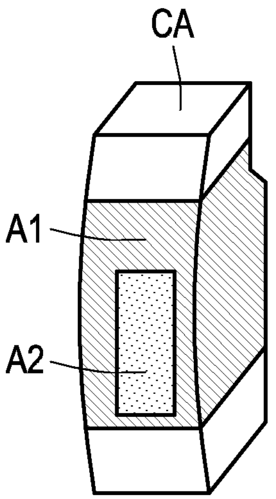
FIG. 3B illustrates an antenna configuration on a carrier according to a fifth embodiment of the disclosure.

FIG. 3A and FIG. 3B respectively illustrate an antenna configuration on a carrier according to a fourth embodiment and a fifth embodiment of the disclosure. With reference to FIG. 3A and FIG. 3B, the first-type antennas A1 are disposed on the first surface of the carrier CA, the second-type antennas A2 are overlapped with a portion of the first-type antennas A1 and electrically isolated from the first-type antennas A1. Specifically, in the fourth and fifth embodiments, there may be a dielectric layer between the first-type antennas A1 and the second-type antennas A2; alternatively, there may be an opening on the first-type antennas A1, and the opening may be configured to accommodate the second-type antennas A2. The second-type antennas A2 may serve as a portion of a radiation element of the first-type antennas A1. In other words, the first-type antennas A1 may act as the carrier of the second-type antennas A2 to reduce the accommodation space of the antennas. Particularly, said method of configuring the antennas may cope with the development of small-sized antennas, and by electrically isolating the overlapping antennas, the transmission coverage and the radiation intensity of the antennas may be improved.

Figure 4A:
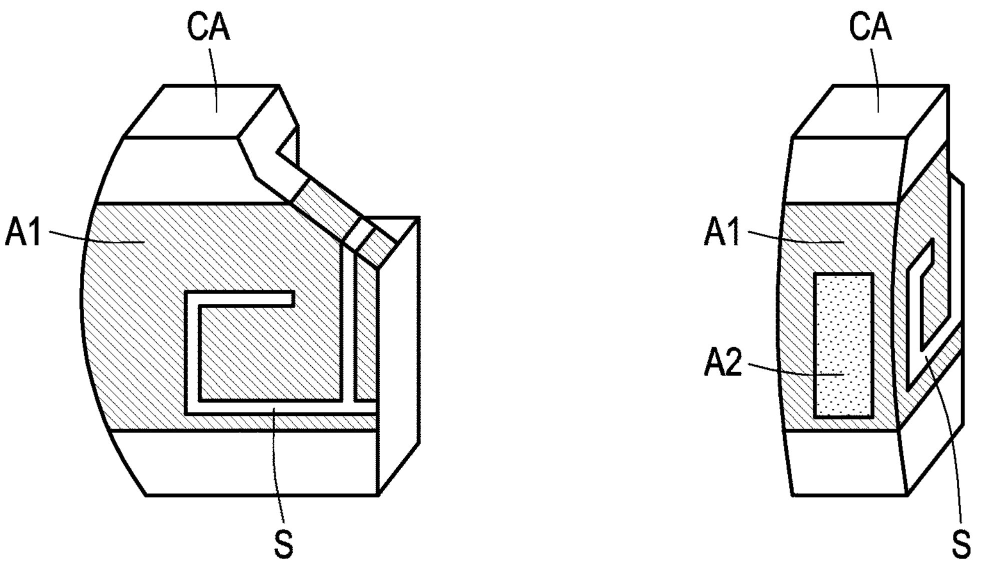
FIG. 4A illustrates an antenna configuration on a carrier according to a sixth embodiment of the disclosure.
Figure 4B:
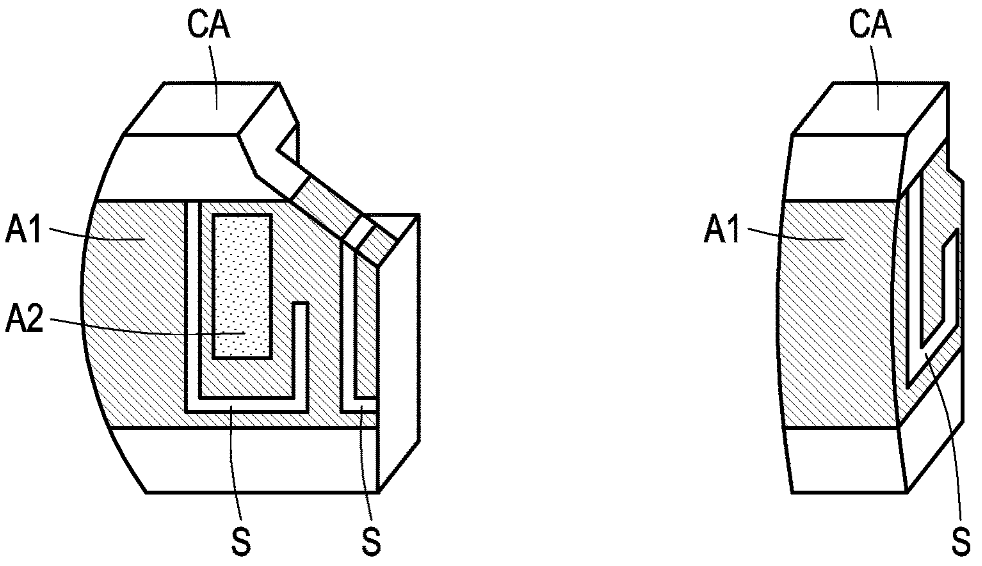
FIG. 4B illustrates an antenna configuration on a carrier according to a seventh embodiment of the disclosure.

FIG. 4A and FIG. 4B respectively illustrate an antenna configuration on a carrier according to a sixth embodiment and a seventh embodiment of the disclosure. With reference to FIG. 4A and FIG. 4B, at least one slot S may be formed on the first-type antennas A1 disposed on the first surface of the carrier CA. The slot S may divide the first-type antennas A1 into a plurality of parts. To be specific, the parts of the first-type antennas A1 have different lengths, respectively. Therefore, the parts divided by the slot S may represent different frequency bands of the first-type antenna A1, respectively, so as to comply with the requirements for multi-band signal transmissions. In addition, the second-type antennas A2 may be disposed at one of these parts, the second surface of the carrier CA adjacent to the first surface, or the second surface of the carrier CA opposite to the first surface, which should not be construed as a limitation in the disclosure.

Figure 5:
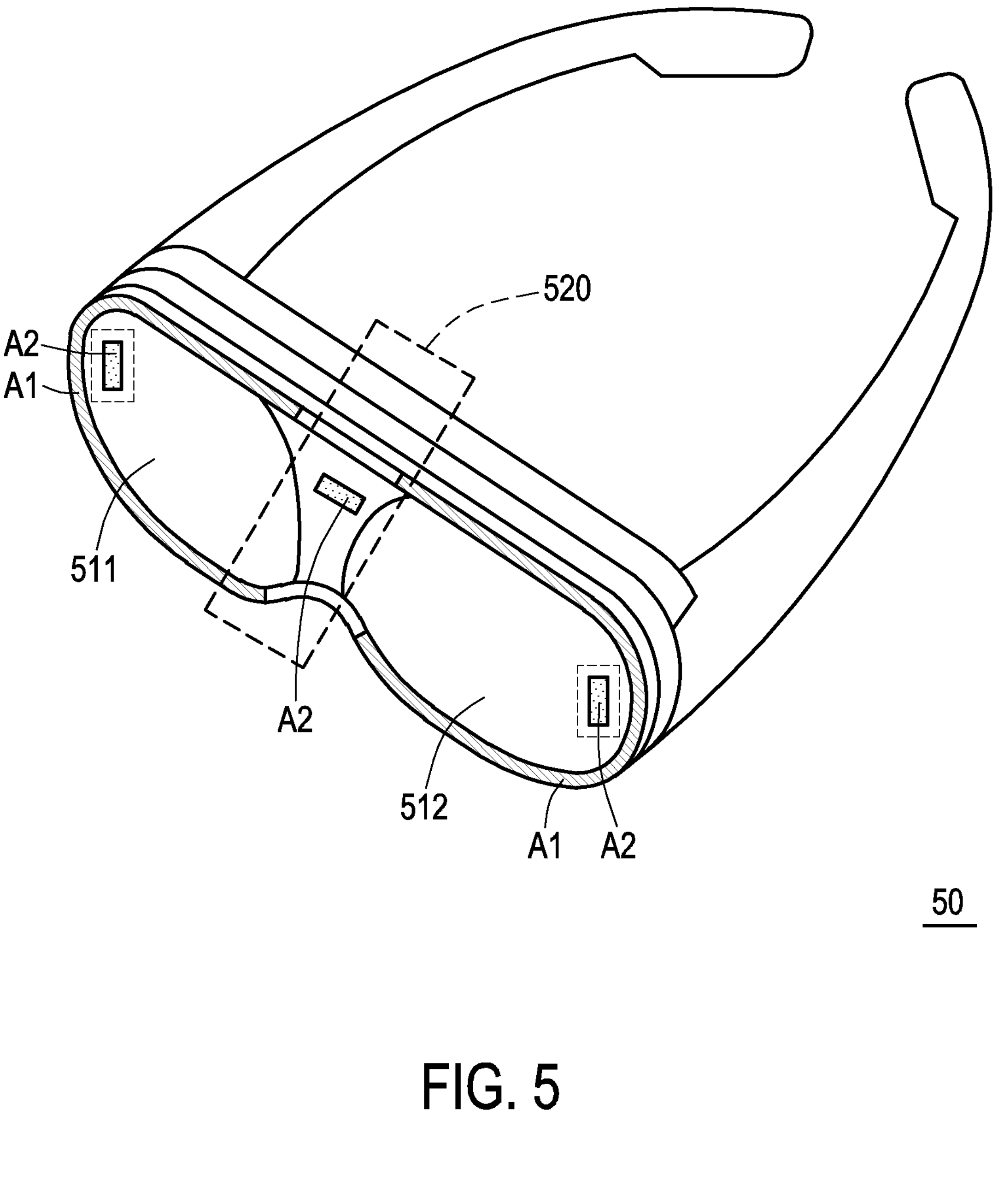
FIG. 5 is a schematic view illustrating a virtual reality device according to an eighth embodiment of the disclosure.

FIG. 5 is a schematic view illustrating a virtual reality device according to an eighth embodiment of the disclosure. With reference to FIG. 5, a virtual reality device 50 includes the elements depicted in FIG. 1. One first-type antenna A1 and one second-type antenna A2 corresponding to the first-type antenna A1 are disposed on the periphery of a first side eyeglass frame 511 and surround the first side eyeglass frame 511. Another first-type antenna A1 and another second-type antenna A2 corresponding to the another first-type antenna A1 are disposed on the periphery of a second side eyeglass frame 512 and surround the second side eyeglass frame 512, and the another first-type antenna A1 and its corresponding second-type antenna A2 are physically isolated from the first-type antenna A1 and the corresponding second-type antenna A2 disposed around the first side eyeglass frame 511. Specifically, distal ends of the first side eyeglass frame 511 and the second side eyeglass frame 512 are made of a non-conductive material. Accordingly, the non-conductive material may serve to distinguish different antennas. Namely, the non-conductive material may serve to physically isolate the antennas disposed at the first side eyeglass frame 511 from the antennas disposed at the second side eyeglass frame 512.

Thereby, the virtual reality device 50 may cope with the development of the small-sized antennas through placing the first-type antenna A1 and the corresponding second-type antenna A2 on the periphery of the first side eyeglass frame 511 or the second side eyeglass frame 522, and the elements required for placing the antennas may be reduced. As shown in FIG. 5, in the virtual reality device 50, it is worth mentioning that the second-type antennas A2 may be disposed at a connection part 520. In the present embodiment, the first-type antennas A1 are the Sub-6G antennas, and the second-type antennas A2 are the mmWave antennas. Accordingly, the second-type antennas A2 disposed at the first side eyeglass frame 511, the second side eyeglass frame 512, and the connection part 520 may cover a radiation range exceeding 270 degrees, thus achieving an improved coverage. In another aspect, the sufficient accommodation space of the first-type antennas A1 disposed at the first side eyeglass frame 511 and the second side eyeglass frame 512 ensures that the characteristics of the first-type antennas A1 may be maintained, so as to increase the radiation intensity.

To sum up, the second-type antennas and the corresponding first-type antennas of the virtual reality device provided herein may be combined and disposed on the main body portion, so as to maintain the characteristics of the first-type antennas and the second-type antennas and further improve the transmission coverage and the radiation intensity.

What is claimed is:

1. A virtual reality device, comprising:

a main body portion, having a first side eyeglass frame, a second side eyeglass frame, and a connection part configured to connect the first side eyeglass frame and the second side eyeglass frame;

a plurality of first-type antennas; and a plurality of second-type antennas, wherein the plurality of second-type antennas and the plurality of first-type antennas corresponding to the plurality of second-type antennas are disposed on a first side of the first side eyeglass frame, on a second side of the second side eyeglass frame, and on the connection part, and each of the first side of the first side eyeglass frame, the second side of the second side eyeglass frame, and the connection part has at least one of the plurality of second-type antennas and at least one of the plurality of first-type antennas corresponding to the at least one of the plurality of second-type antennas, wherein each of the plurality of second-type antennas corresponds to one of the plurality of first-type antennas, and the first side of the first side eyeglass frame is opposite to the second side of the second side eyeglass frame, wherein one of the plurality of second-type antennas is a portion of a radiation element of one of the plurality of first-type antennas corresponding to the one of the plurality of second-type antennas, wherein an opening is formed on each of the plurality of first-type antennas, and the opening is configured to accommodate a corresponding one of the plurality of second-type antennas, wherein each of the plurality of second-type antennas is electrically isolated from each of the plurality of first-type antennas.

2. The virtual reality device according to claim 1, wherein each of the plurality of first-type antennas is coupled to a mainboard through a connector, and the virtual reality device further comprises:

a heat dissipation device, disposed on the mainboard; and a radio frequency signal processing circuit, disposed on the mainboard and electrically coupled to each of the plurality of second-type antennas through a conductive wire.

3. The virtual reality device according to claim 2, wherein each of the plurality of first-type antennas transmits and receives a first-type radio frequency signal through the connector.

4. The virtual reality device according to claim 3, wherein each of the plurality of second-type antennas transmits and receives a second-type radio frequency signal through the conductive wire and the radio frequency signal processing circuit.

5. The virtual reality device according to claim 4, wherein a working frequency band of the first-type radio frequency signal is different from a working frequency band of the second-type radio frequency signal.

6. The virtual reality device according to claim 4, wherein each of the plurality of first-type antennas and each of the plurality of second-type antennas are respectively coupled to two independent signal sources.

7. The virtual reality device according to claim 1, wherein each of the plurality of first-type antennas is disposed on a first surface of a carrier, and each of the plurality of second-type antennas is overlapped with one portion of each of the plurality of first-type antennas and is electrically isolated from each of the plurality of first-type antennas.

8. The virtual reality device according to claim 7, wherein at least one slot is formed on each of the plurality of first-type antennas disposed on the first surface of the carrier, and the at least one slot is configured to divide each of the plurality of first-type antennas into a plurality of parts.

9. The virtual reality device according to claim 8, wherein the plurality of parts of each of the plurality of first-type antennas respectively have different lengths.

10. The virtual reality device according to claim 1, wherein one of the plurality of first-type antennas and a corresponding second-type antenna of the plurality of second-type antennas are disposed on a periphery of the first side eyeglass frame and surround the first side eyeglass frame, and another of the plurality of first-type antennas and another corresponding second-type antenna of the plurality of second-type antennas are disposed on a periphery of the second side eyeglass frame, surround the second side eyeglass frame, and are physically isolated from the one of the plurality of first-type antennas and the corresponding second-type antenna of the plurality of second-type antennas disposed on the periphery of the first side eyeglass frame.

* * * * *